US009954373B2

(12) United States Patent
Bolus

(10) Patent No.: US 9,954,373 B2
(45) Date of Patent: Apr. 24, 2018

(54) POWER RECEIVER CIRCUIT

(71) Applicant: uBeam Inc., Santa Monica, CA (US)

(72) Inventor: Jonathan Bolus, Santa Monica, CA (US)

(73) Assignee: uBeam Inc., Santa Monica, CA (US)

( * ) Notice: Subject to any disclaimer, the term of this patent is extended or adjusted under 35 U.S.C. 154(b) by 183 days.

(21) Appl. No.: 15/132,074

(22) Filed: Apr. 18, 2016

(65) Prior Publication Data

US 2017/0302083 A1   Oct. 19, 2017

(51) Int. Cl.
*H01F 27/42* (2006.01)
*H02J 5/00* (2016.01)
*H02M 3/04* (2006.01)
*H02M 7/04* (2006.01)

(52) U.S. Cl.
CPC ............... *H02J 5/00* (2013.01); *H02M 3/04* (2013.01); *H02M 7/04* (2013.01)

(58) Field of Classification Search
CPC ............. H02J 5/00; H02M 3/04; H02M 7/04
USPC .......................................... 307/104; 320/108
See application file for complete search history.

(56) References Cited

U.S. PATENT DOCUMENTS

| 2013/0241468 A1* | 9/2013 | Moshfeghi | H02J 7/025 320/107 |
| 2013/0241474 A1* | 9/2013 | Moshfeghi | H02J 7/0027 320/108 |
| 2016/0099601 A1* | 4/2016 | Leabman | H02J 50/40 307/104 |

* cited by examiner

*Primary Examiner* — Thomas Skibinski
(74) *Attorney, Agent, or Firm* — Morris & Kamlay LLP

(57) ABSTRACT

Systems and techniques are provided for a power receiver circuit. A power receiver circuit may include power generating elements that may generate alternating current. The power receiver circuit may include group circuits that may connect power generating elements in parallel to combine the alternating current from the power generating elements into a single alternating current. The power receiver circuit may include rectifier circuits which may include rectifier channels connected to the group circuits and may include a rectifier that may generate direct current from alternating current. The power receiver circuit may include a step down converter connected to rectifier circuits that may convert direct current to direct current of a target voltage level. An output switch and linear regulator may be connected to the step down converter, and a microcontroller may be connected to the linear regulator and the output switch and may control the output switch.

25 Claims, 12 Drawing Sheets

US 9,954,373 B2

POWER RECEIVER CIRCUIT

BACKGROUND

Power generating mechanisms may deliver alternating current to a device that may run on direct current. The device may operate, or charge a battery, using the alternating current by converting it to direct current. The alternating current delivered by some power generating mechanisms may have varying amplitudes, which may result in inefficient conversion of the alternating current to direct current.

BRIEF SUMMARY

According to implementations of the disclosed subject matter, a power receiver circuit may include a power generating mechanism including power generating elements that may generate alternating current signals. The power receiver circuit may include group circuits. Each group circuit may connect a group of power generating elements in parallel in an electrical circuit to combine the alternating current signals from the power generating elements in the group into a single alternating current signal. The power receiver circuit may include rectifier circuits. Each rectifier circuit may include rectifier channels. Each rectifier channel may be connected to one of the group circuits. Each rectifier channel may include a rectifier that may generate a direct current signal from an alternating current signal, a switch bank including two or more outputs, and a maximum power point tracker (MPPT). The power receiver circuit may include a voltage bus including capacitors. Each capacitor may be connected to one of the rectifier circuits. The power receiver circuit may include undervoltage lockouts. Each undervoltage lockout may have an input connected to one of the capacitors and an output. Each undervoltage lockout may disconnect its output when a voltage level input to the undervoltage lockout drops below a predetermined threshold. The predetermined threshold may be different for two of the undervoltage lockouts. The power receiver circuit may include DC/DC converters. Each DC/DC converter may be connected to one of the undervoltage lockouts. Each DC/DC converter may convert a direct current signal of a predetermined voltage level to a direct current signal of a target voltage level. The predetermined voltage level may be different for two of the DC/DC converters.

A power receiver circuit may include a power generating mechanism including power generating elements that may generate alternating current signals. The power receiver circuit may include group circuits. Each group circuit may connect a group of power generating elements in parallel in an electrical circuit to combine the alternating current signals from the power generating elements in the group into a single alternating current signal. The power receiver circuit may include rectifier circuits. Each rectifier circuit may include rectifier channels. Each rectifier channel may be connected to one of the group circuits. Each rectifier channel may include a rectifier that may generate a direct current signal from an alternating current signal. The power receiver circuit may include a step down converter connected to the rectifier circuits. The step down converter may convert a direct current signal to a direct current signal of a target voltage level. The power receiver circuit may include an output switch connected to the step down converter. The power receiver circuit may include a linear regulator connected to the step down converter. The power receiver circuit may include a microcontroller connected to the linear regulator and the output switch and that may control the output switch.

Systems and techniques disclosed herein may allow for a power receiver circuit. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
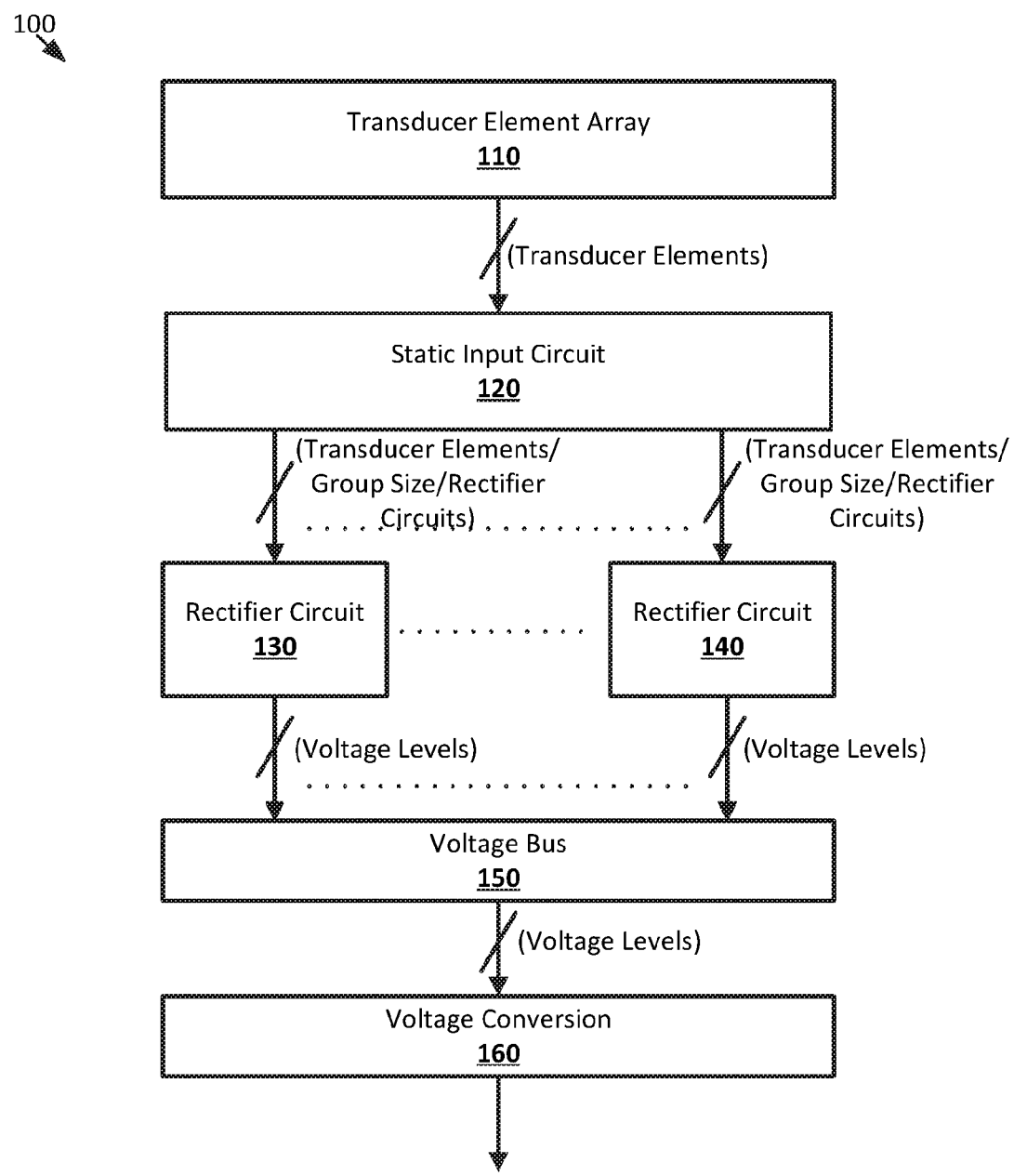
FIG. 1 shows an example system suitable for a power receiver circuit according to an implementation of the disclosed subject matter.

According to embodiments disclosed herein, alternating current signals of varying amplitudes may be efficiently converted to a direct current signal with a specified voltage. The alternating current signals may be converted to direct current signals of different voltages depending on the magnitude of each alternating current signal. The direct current signals of different voltages may then be converted to direct current signals of the same, specified, voltage, which may be combined into an output direct current signal of the specified voltage.

A power receiver circuit may be connected to a power generating mechanism. The power generating mechanism may be, for example, an array of power generating elements. For example, the power generating mechanism may be a transducer array, such as an optical transducer array or an ultrasonic transducer array including any suitable number of ultrasonic transducer elements, or a radio frequency (RF) receiver. Each power generating element may generate an alternating current signal of varying amplitude, and amplitudes and phases of the alternating current signals generated by different power generating elements may vary, resulting in alternating current signals of varying voltages. For example, ultrasonic transducer elements of an ultrasonic transducer array may generate alternating current signals based on the movement of a flexure, such as a piezoelectric flexure, in response to received ultrasound waves. The amplitude of the alternating current signals generated by an ultrasonic transducer element may vary as the amplitude of the ultrasonic waves received by the ultrasonic transducer element change. Different ultrasonic transducer elements in the same ultrasonic transducer array may generate alternating current signals with different amplitudes, resulting in the alternating current signals having different voltages. The alternating current signals may have various phase shifts relative to each other.

The power receiver circuit may include a static input circuit. The power generating elements of the power generating mechanism may be connected to the static input circuit. The static input circuit may include any suitable number of group circuits, each connecting any suitable number of the power generating elements in parallel. For example, an ultrasonic transducer array may include 256 ultrasonic transducer elements. The static input circuit may include 64 group circuits, each of which connects a group of 4 ultrasonic transducer elements in parallel electrically. Each group circuit may include its own output, which may output an alternating current signal that results from combining the alternating current signals of the power generating elements connected to the group circuit. For example, a static input circuit with 64 group circuits may include 64 outputs. The power generating elements in a group connected to the same group circuit may be selected in any suitable manner, such as, for example, physical proximity. For example, in an ultrasonic transducer array, 4 ultrasonic transducer elements that are neighbors in a square may be connected to the same group circuit of the static input circuit. This may minimize the variance in the amplitude and phases of the alternating current signals generated by the ultrasonic transducer elements and fed into the group circuit, as the physical proximity of the ultrasonic transducer elements may result in them receiving similar ultrasonic waves. The static input circuit and group circuits may be implemented in any suitable manner. For example, the static input circuit may be implemented through routing circuitry on layers of a PCB which includes the power generating elements. In some implementations, the group circuits may connect the power generating elements in series.

The power receiver circuit may include any suitable number of rectifier circuits. For example, there may be one rectifier circuit for every 32 group circuits in the static input circuit. Each rectifier circuit may include any suitable number of channels, which may be connected to the outputs of the group circuits. The number of channels in a rectifier circuit may be equal to number of group circuits connected to the rectifier circuit. For example, a rectifier circuit connected to 32 group circuits may include 32 channels, with each channel connected to the outputs of one of the group circuits.

A rectifier channel may include a rectifier, a maximum power point tracker (MDPT), and a switch bank. The rectifier may be an AC/DC rectifier of any suitable type. The rectifier be a full-wave bridge rectifiers with differential inputs. The rectifier may use a diode bridge, Schottky diodes, diode-connected FETS, or may be any form of synchronous rectifier. The rectifier may receive the alternating current signal from a group circuit of the static input network and may output a direct current signal of any suitable voltage.

The switch bank may include any suitable number of outputs, which may carry a direct current signal received from the rectifier. Each of the outputs of the switch bank may be assigned a different voltage level, and the switch bank may select only one output at a time to receive the direct current signal from the rectifier. The direct current signal from the rectifier may be output from the rectifier channel through the selected output of the rectifier channel's switch bank. For example, a switch bank may include five outputs, which may be assigned voltage levels of 6 Volts, 10 Volts, 14 Volts, 18 Volts, and 22 Volts. The voltage of the direct current signal output by the rectifier may be, or be within a range of, the voltage of the selected switch bank output. The outputs of the switch banks of the rectifier channels of a rectifier circuit may be combined, so that the rectifier circuit may have a number of outputs equal to the number of outputs of a single switch bank. Each output from a rectifier circuit may be connected to outputs from the switch banks of the rectifier channels that were assigned the same voltage level. For example, a rectifier circuit with 32 rectifier channels with switch banks with five outputs may have five outputs. Each output may be a combination of the direct current signals from the 32 rectifier channel for one of the 5 switch bank output voltage levels. For example, if the voltage levels assigned to the switch bank outputs are 6 Volts, 10 Volts, 14 Volts, 18 Volts, and 22 Volts, the rectifier circuit may have 6 Volt output that is connected to the 32 6 Volt outputs of the 32 switch banks of the 32 rectifier channels, a 10 Volt output that is connected to the 32 10 Volt outputs of the 32 switch banks of the 32 rectifier channels, a 14 Volt output that is connected to the 32 14 Volt outputs of the 32 switch banks of the 32 rectifier channels, a 18 Volt output that is connected to the 32 18 Volt outputs of the 32 switch banks of the 32 rectifier channels, and a 22 Volt output that is connected to the 32 22 Volt outputs of the 32 switch banks of the 32 rectifier channels.

The MPPT may monitor the operation the rectifier, and may select which of the switch bank's outputs should be used to output the direct current signal generated by the rectifier from the rectifier channel. The selected output may be based on the voltage level that will maximize the power transferred out of the rectifier channel. The MPPT may monitor the rectifier and select a switch bank output in any suitable manner. For example, the MPPT may monitor the conduction angle of the rectifier, which may be the amount of time for which the rectifier is conducting, and select an output of the switch bank to maintain the conduction angle within a specified range. The MPPT may measure the open-circuit voltage of the alternating current signal at the rectifier input after temporarily disabling the rectifier, and may select a switch bank output based on some fraction of the measured open-circuit voltage at the input of the rectifier. The MPPT may, instead of directly monitoring the rectifier, iteratively select each of the available outputs of the switch bank, measure the power transfer achieved through each output, and then select the output that exhibits the maximum power transfer. The MPPT may select an output of the switch bank at any suitable interval and at any suitable rate, and may leave an output selected for any suitable length of time before selecting a different output.

The rectifier circuit and rectifier channels may be implemented in any suitable manner. For example, each rectifier circuit may be implemented as an ASIC. Each rectifier channel may be implemented in the ASIC for a rectifier circuit. The rectifier circuit ASICs may be installed on the same PCB that includes the static input circuit and the power generation elements, for example, on a PCB layer on the opposite side of the PCB from the power generation elements.

The power receiver circuit may include a voltage bus. The voltage bus may include any suitable number of direct current inputs, of any suitable voltage levels, connected to any suitable number of capacitors or other forms of power storage. The number of direct current inputs to the voltage bus may be the same as the number of the direct current outputs of a switch bank multiplied by the number of rectifier circuits. For example, the voltage bus may be connected to 4 rectifier circuits. The rectifier circuits may each have 32 channels, with switch banks with five outputs. The voltage bus may include 20 direct current inputs to match the 20 total direct current outputs of the 4 rectifier circuits. The outputs from each rectifier circuit may be connected to one of the capacitors of the voltage bus in parallel. For example, each of 4 rectifier circuits may have 6 Volt outputs. The 6 Volt outputs from the 4 rectifier circuits may be connected to a capacitor on the voltage bus. Each of the capacitors of the voltage bus may have its own direct current output from the voltage bus. The voltage of the direct current signal carried on the output of a capacitor may match the voltages of the direct current signals input into the capacitor from the rectifier circuits. For example, a capacitor into which 6 Volt direct current signals are input may output a 6 Volt direct current signal. The number of outputs from the voltage bus may be equal to the number of capacitors, which may in turn be equal to the number of outputs from a switch bank of a rectifier channel. The voltage bus may be implemented in any suitable manner. For example, the voltage bus may be implemented on any suitable of layer of the PCB. The voltages of the direct current signal both input to and output from the capacitors may vary within a range of the voltages of the outputs from the rectifier circuits. For example, voltages of direct current signals carried on a 6 Volt output from the rectifier circuit may vary over any suitable range around 6 Volts, and the voltage of the direct current signal output of the capacitor connected to the 6 Volt output may vary in a range around 6 Volts. The range over which the voltage of the direct current signal output from the capacitor varies may be smaller than the range over which the voltage of the direct current signal input to the capacitor varies.

The power receiver circuit may include any suitable number of voltage converters. For example, the power receiver circuit may include a number of DC/DC voltage converters equal to the number of outputs from the capacitors of the voltage bus. Each DC/DC voltage converter may be connected to the output of one of the capacitors of the voltage bus, and may convert the direct current signal with that capacitor's output voltage to some specified, target, voltage. The target voltage may be the same for all of the DC/DC voltage converters in the power receiver circuit. For example, a first DC/DC voltage converter may be connected to a capacitor that outputs a 6 Volt direct current signal, and may convert that to a 5 Volt direct current signal. A second DC/DC voltage converter may be connected to a capacitor that outputs a 10 Volt direct current signal, and may convert that to a 5 Volt direct current signal. The direct current signals output by the DC/DC voltage converters may be combined, resulting in a single direct current signal of the target voltage level that may be output from the power receiver circuit and used in any suitable manner, such as, for example, to power and suitable electric or electronic device or circuit, such as a charging circuit for a battery. The DC/DC voltage converters may be implemented in any suitable manner. For example, the DC/DC voltage converters may be switching converters, and may be discrete converters, or may be integrated.

Each DC/DC voltage converter may have an undervoltage lockout. An undervoltage lockout may be connected in between the output of each capacitor of the voltage bus and each DC/DC voltage converter, and may be any suitable device or mechanism for detecting voltage levels of the output from the capacitors and cutting off the direct current signal input into the DC/DC voltage converters when the voltage drops too low, for example, below a threshold level, and reconnecting the direct current signal when the voltage is at or above the threshold level. For example, a capacitor may output a 10 Volt direct current signal. If the voltage lockout detects that the output from the capacitor has dropped too far below 10 Volts, for example, due to the capacitor being undercharged, the voltage lockout may disconnect the capacitor from the DC/DC voltage converter that converts the direct current signal from 10 Volts to 5 Volts. The undervoltage lockout may reconnect that capacitor to the DC/DC voltage converter when the voltage output from the capacitor has reached a suitable level, for example, within any suitable range of or above 10 Volts. An undervoltage lockout may be set to disconnect and reconnect a DC/DC voltage converter from a capacitor based on any suitable voltage threshold, and undervoltage lockouts connected to different voltage levels may have different thresholds.

In some implementations, each rectifier channel may include a rectifier and a single output. The outputs from the rectifier circuits may be connected to a step down converter. The step down converter may receive as input a direct current signal that is the combined output of all of the rectifier channels of all of the rectifier circuits, and may convert the voltage of this direct current signal to a specified, target voltage, such as, for example, 5 Volts. The step down converter may use any suitable components for stepping down DC voltages, and may be able to accept direct current signals over a wide range of voltages input and convert these direct current signals to a direct current signal of the target voltage. The output of the step down converter may go to both a linear regulator and an output switch. The output of the output switch may be the output for the power receiver circuit, and may be, for example, connected to a charging circuit for a battery. When the output switch is closed, power may be delivered from the power receiver circuit to a circuit, such as the charging circuit, connected to the output. The opening and closing of the output switch may be controlled by a microcontroller.

The linear regulator may convert the direct current signal of the target voltage output by the step down converter to a direct current signal having a native voltage level for the microcontroller. The output of the linear regulator may be connected to the microcontroller, powering the microcontroller. The microcontroller may be any suitable electronic microcontroller, and may include an integrated analog-to-digital converter and radio. The microcontroller may monitor the operation of the power receiver circuit. For example, the microcontroller may monitor the voltage ($V_{RECT}$) of the direct current signal being output from the rectifier circuits into the step down converter, the voltage ($V_{LOAD}$) of the direct signal being output from the step down converter to the linear regulator and output switch, and the amperage ($I_{LOAD}$) of the direct current signal being output from the output switch. The microcontroller may use the radio to communicate with a transmitting device that transmits wireless power to the power generating mechanism, for example to report $V_{RECT}$, $V_{LOAD}$, and $I_{OUT}$, so that the transmitting device may adjust the delivery of wireless power to the power generating mechanism. The microcontroller may control the opening and closing of the output switch, for example, through an enable/disable line connecting the microcontroller to the output switch.

The microcontroller may implement a state machine. The state machine may include four states, a dead state, a handshake state, a standby state, a charge state. In the dead state, there may not be enough power to operate the microcontroller. For example, the power generating mechanism may not generate enough power to generate a direct current signal of sufficient voltage through the step down converter and linear regulator to operate the microcontroller, and a secondary source of power, such as a battery connected to a charging circuit connected to the power receiver circuit, may also not have enough power to operate the microcontroller. In the dead state, if the power generating mechanism begins to receive sufficient power from the transmitting device, the power generating mechanism may begin to generate power in the form of an alternating current signal. When the power generating mechanism generates sufficient power to raise the voltage of the direct current signal supplied to the microcontroller from the linear regulator to operating levels, the microcontroller may generate a power-on-reset signal and enter the handshake state.

In the handshake state, the microcontroller may use the radio to communicate with the transmitting device. The radio may communicate any suitable data to the transmitting device, including, for example, data regarding characteristics of the power generating mechanism that may be used by the transmitting device to adjust various aspects of power delivered to the power generating mechanism. For example, the radio may communicate data that indicates the presence of the power generating mechanism, the location of the power generating mechanism, and may authenticate the power receiver circuit to the transmitting device, which may only transmit power to the power generating mechanisms of authenticated power receiver circuits. Once communication has been established with the transmitting device, the microcontroller may enter the standby state. The microcontroller may enter the standby state after receiving an instruction (TX_STBY) from the transmitting device.

In the standby state, the microcontroller may use the radio to communicate with the transmitting device. The communication may be periodic, and may include any suitable data, such as, for example $V_{RECT}$ and $V_{LOAD}$ values as determined by the microcontroller. The transmitting device may use the data received from the microcontroller to adjust the delivery of power to the power generating mechanism in any suitable manner. For example, the transmitting device may adjust the phase, amplitude, focus, and steering of an ultrasonic beam directed at an ultrasonic transducer array. The transmitting device may determine the minimum amount of power that can be delivered to the power generating mechanism to allow the power receiver circuit to output a useful amount of power. For example, the transmitting device may determine the minimum amount of power needed to allow the power receiver circuit to charge a device battery through a chagrining circuit that receives power output by the power receiver circuit. The transmitting device may, for example, compare received $V_{RECT}$ values to a predetermined threshold for rectifier voltage ($V_{RECT\_TH}$), and determine the minimum power that can be delivered to the power generating mechanism to maintain $V_{RECT}>V_{RECT\_TH}$ at the input of the step down converter from the rectifier circuits of the power receiving circuit. When the transmitting device has determined the minimum power that it needs to deliver, the transmitting device may instruct the microcontroller to enter the charge state, for example, sending an appropriate command (TX_CHARGE), to the microcontroller through the radio.

In the charge state, the microcontroller may cause the output switch to close, allowing the power receiver circuit to deliver power to a suitable circuit, such as a charging circuit for a battery, connected to the output of the output switch. The power delivered by the closed output switch may be a direct current signal having the same voltage level $V_{LOAD}$ as the direct current signal output from the step down converter, which may be, for example, 5 Volts, and may have amperage $I_{LOAD}$. The microcontroller may continue to communicate with the transmitting device through the radio while in the charge state. For example, the microcontroller may send $V_{RECT}$, $V_{LOAD}$, and $I_{LOAD}$ values to the transmitting device, which may make adjustments to the power delivered to the power generating mechanism to maintain $V_{RECT}$, $V_{LOAD}$, and $I_{LOAD}$ at desired values.

The transmitting device may instruct the microcontroller exit the charge state and return to the standby state, for example, sending an appropriate command (TX_STBY), to the microcontroller through the radio. The transmitting device may cause the microcontroller to exit the charge state, for example, if the value of $I_{LOAD}$ drops below a predetermined threshold, which may indicate that power is no longer needed by the circuit connected to the output switch. For example, a battery being charged by a charging circuit connected to the output switch may be fully charged. The transmitting device may cause the microcontroller to exit the charge state and enter standby if the transmitting device intends to stop delivering power to the power generating mechanism for any suitable reason. The microcontroller may also exit the charge state if $V_{LOAD}$ falls below a predetermined threshold ($V_{LOAD\_TH\_FALL}$), which may be an indication that step down converter can no longer maintain $V_{LOAD}$ in regulation at the appropriate voltage level. The microcontroller may exit the charge state, enter the standby state, and send a message indicating that $V_{LOAD}$ dropped (RX_VLOAD_FAIL) to the transmitting device. Whenever the microcontroller exits the charge state, the microcontroller may cause the output switch to open.

The microcontroller may return to the dead state from the handshake state, standby state, and charge state. For example, the voltage (VDD) of the direct current signal supplied to the microcontroller through the linear regulator may drop below a brown-out threshold (VDD_TH_FALL) for the microcontroller, which may result in the microcontroller entering the dead state from whatever state it is in at the time the drop in VDD occurs. Drops in VDD may occur, for example, due to interruption in the power being delivered to the power generating mechanism from the transmitting device. For example, an ultrasonic beam may be blocked from reaching an ultrasonic transducer array by an obstructing object, or the amount of power delivered may be reduced due to environmental interference.

The power receiver circuit may be implemented using any suitable combination of hardware and software. For example, components of the power receiver circuit may be implemented in whole or in part as a field programmable gate array (FPGA) or application-specific integrated circuit (ASIC) or complex programmable logic device (CPLD), or using integrated circuit packages. Components of the power receiver circuit may be connected in any suitable manner. For example, connections between components may be implemented as traces on PCB, or using any other suitable type of electrical connection for carrying alternating current signals and direct current signals. Voltage levels of direct current signals may be approximate, or within suitable ranges of specified voltage levels. For example, the direct signal output at the target voltage level may vary in any suitable range around the target voltage level.

FIG. 1 shows an example system suitable for a power receiver circuit according to an implementation of the disclosed subject matter. A power receiver circuit 100 may include transducer element array 110, a static input circuit 120, rectifier circuits 130 and 140, a voltage bus 150, and voltage conversion 160. The power receiver circuit 100 may be able to receive power transmitted wirelessly, for example, through optical, ultrasonic, or RF transmission, using the transducer element array 110.

The transducer element array 110 may be a power generating mechanism for the power receiver circuit 100. The transducer element array 110 may have a number of outputs for current equal to the number of elements in the transducer element array 110. The elements of the transducer element array 110 may each output current to the static input circuit 120. The static input circuit 120 may combine, in parallel, the currents output from the elements of the transducer element array 110. The currents may combined in any suitable manner. For example, the static input circuit 120 may combine the currents output from separate groups of elements of the transducer element array 110, with each group of elements having its own separate output from the static input circuit 120. The outputs of the static input circuit 120 may be connected to rectifier circuits, including the rectifier circuits 130 and 140. The current carried by the outputs of the static input circuit 120 may be AC.

The power receiver circuit 100 may include any suitable number of rectifier circuits. The outputs from the static input circuit 120 may be divided among the available rectifier circuits, including the rectifier circuits 130 and 140, in any suitable manner. For example, each rectifier circuit may be connected to the same number of distinct outputs from the static input circuit 120. Each rectifier circuit may have a number of outputs. Different outputs from the rectifier circuits may be assigned to carry current having different voltage levels. The number of outputs, and the voltages they carry, may be the same for each rectifier circuit. The outputs from the rectifier circuits may be connected to the voltage bus 150. The current carried by the outputs of the rectifier circuits may be DC, converted from the AC input into the rectifier circuits from the static input circuit 120.

The voltage bus 150 may include a number of outputs equal to the total number of different voltage levels output by the rectifier circuits. For example, if the rectifier circuit 130 include a separate output for each of five different voltage levels, the voltage bus 150 may include five separate outputs. The voltage bus 150 may combine the outputs of the rectifier circuits, including the rectifier circuits 130 and 140, by voltage level. The outputs of the voltage bus 150 may be connected to the voltage conversion 160.

The voltage conversion 160 may include a number of voltage converters. Each of the voltage converters in the voltage conversion 160 may receive one of the outputs of the voltage bus 150, and convert the DC carried by the output to DC of a set voltage level. For example, each voltage converter may convert the received DC to 5 Volt DC. The outputs of the voltage converters may be combined and output as a single current from the voltage conversion 160. The DC output from the voltage conversion 160 may be used to provide power to another device or mechanism, such as, for example, a charging circuit which may charge a battery.

Figure 2:
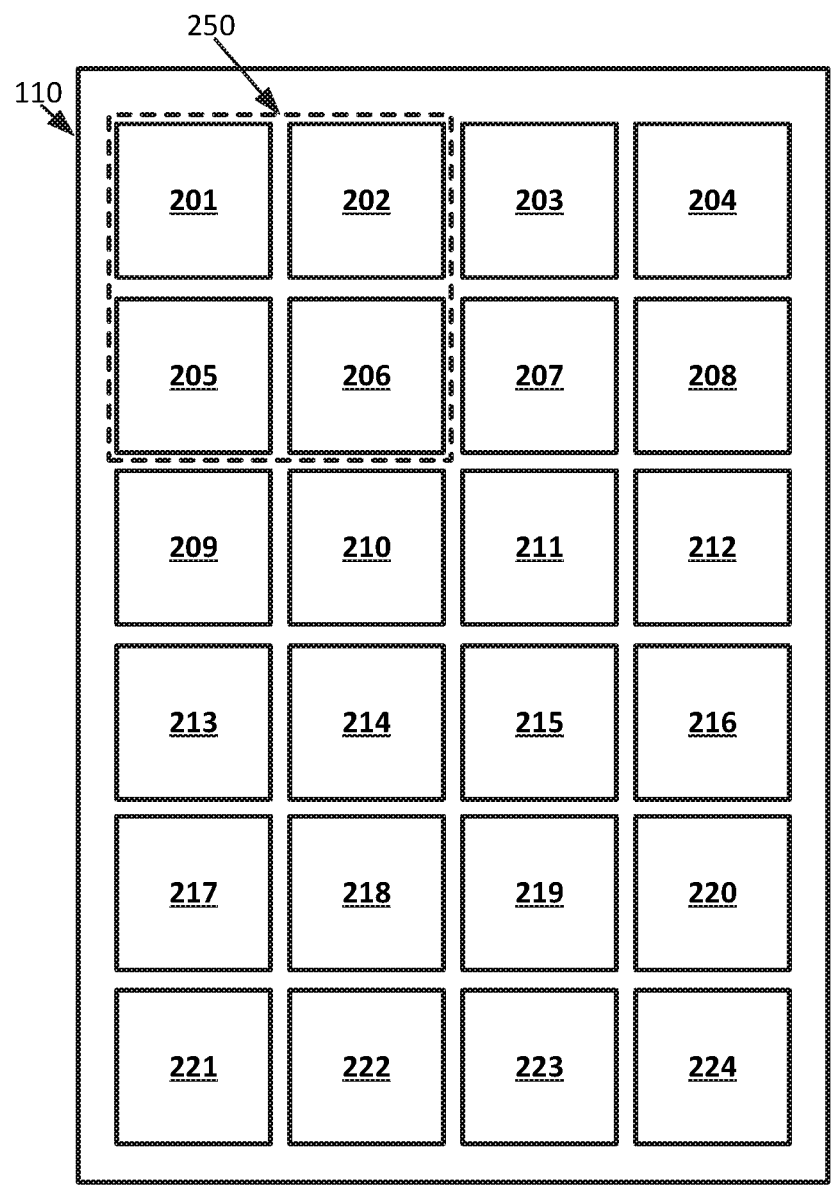
FIG. 2 shows an example system suitable for a power receiver circuit according to an implementation of the disclosed subject matter.

FIG. 2 shows an example system suitable for a power receiver circuit according to an implementation of the disclosed subject matter. The transducer element array 110 may include transducer elements 201, 202, 203, 204, 205, 206, 207, 208, 209, 210, 211, 212, 213, 214, 215, 216, 217, 218, 219, 220, 221, 222, 223, and 224, which may be any suitable type of transducers for receiving power transmitted wirelessly in any suitable form. For example, the transducer elements 201-224 may be ultrasonic transducers, which may convert ultrasonic sound waves into AC. The transducer elements 201-224 may be grouped into a number of groups, which may include any suitable number of transducer elements in any suitable arrangement. For example, a group 250 may include the transducer elements 201, 202, 205, and 206, which may form a 2×2 grid. Transducer elements in a group may be selected based on proximity, which may reduce the variation in the phase and amplitude of the AC generated by the transducer elements in the group. For example, the transducer elements 201, 202, 205, and 206 may be ultrasonic transducers, and may generate AC with similar phase and amplitude when receiving ultrasonic sound waves from a transmitting device, as physical proximity may result in the transducer elements 201, 202, 205, and 206 experiencing a transmitted ultrasonic wave in a similar manner.

Figure 3:
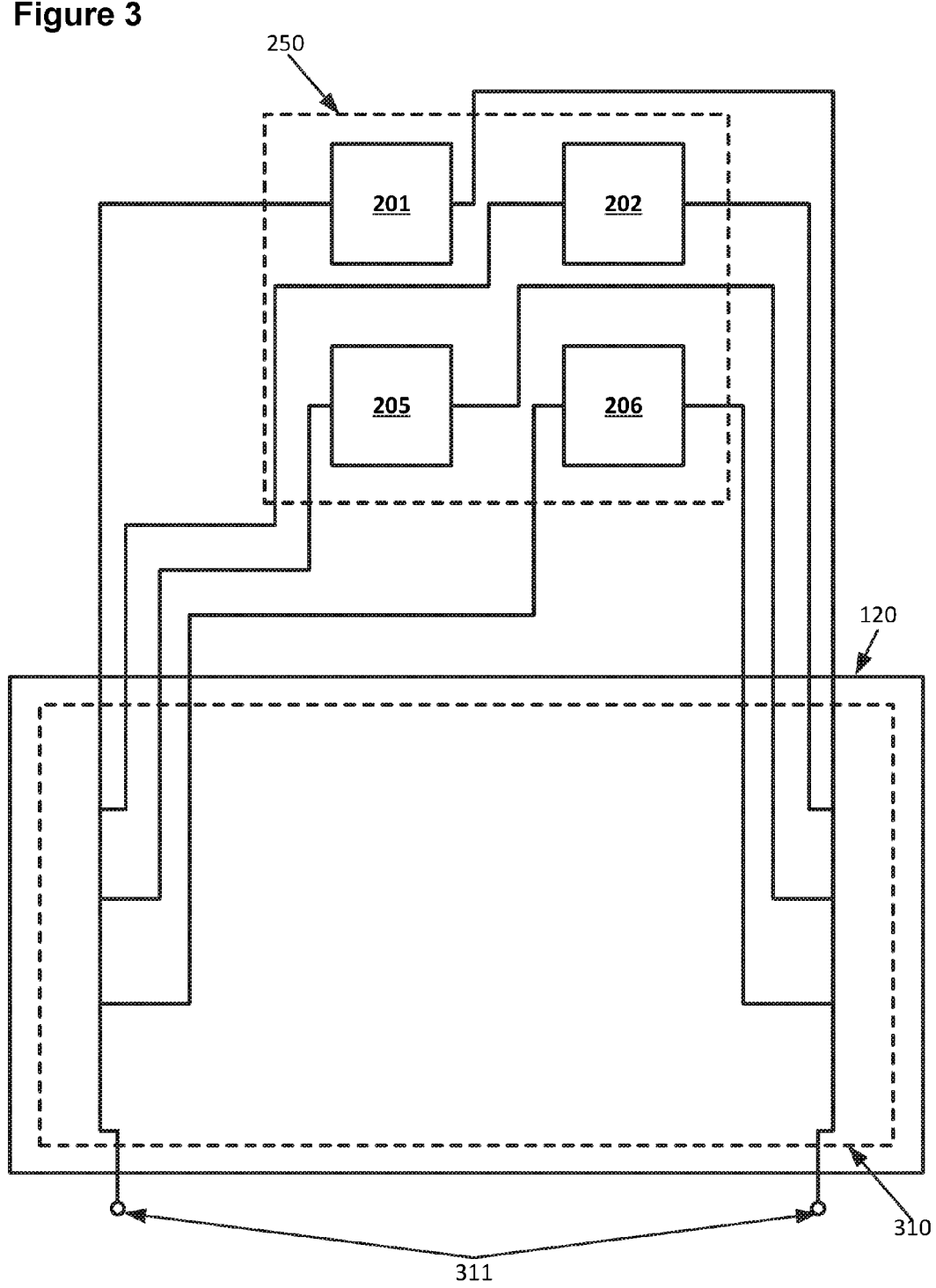
FIG. 3 shows an example system suitable for a power receiver circuit according to an implementation of the disclosed subject matter.

FIG. 3 shows an example system suitable for a power receiver circuit according to an implementation of the disclosed subject matter. The transducer elements 201-224 of the transducer element array 110 may be connected to the static input circuit 120. The static input circuit 120 may include a separate group circuit, such as the group circuit 310 for each group, such as the group 250, of the transducer elements 201-224, to connect the transducer elements of the group in parallel. For example, the outputs of each of the transducer elements 201, 202, 205, and 206 of the group 250 may be connected in parallel by the group circuit 310, which may output the combined output of the group 250 using the output 311. The output 311 may carry current that is the combination of the AC generated by each of the transducer elements 201, 202, 205, and 206 of the group 250. Each group circuit of the static input circuit 120 may include its own output, so that the number of outputs, such as the output 311, from the static input circuit 120 may be equal to the number of transducer elements of the transducer element array 110 divided by the number of transducer elements per group, such as the group 250. The static input circuit 120 may be implemented in any suitable manner. For example, the static input circuit 120 may be implemented with traces on any number of layers of a PCB which may also include the transducer element array 110. The outputs from transducer elements may be electrically connected to the static input circuit in any suitable manner. For example, traces and vias may be used to route connections through any number of layers of a PCB to connect each of the transducer elements 201-224 to its group circuit in the static input network 120.

Figure 4:
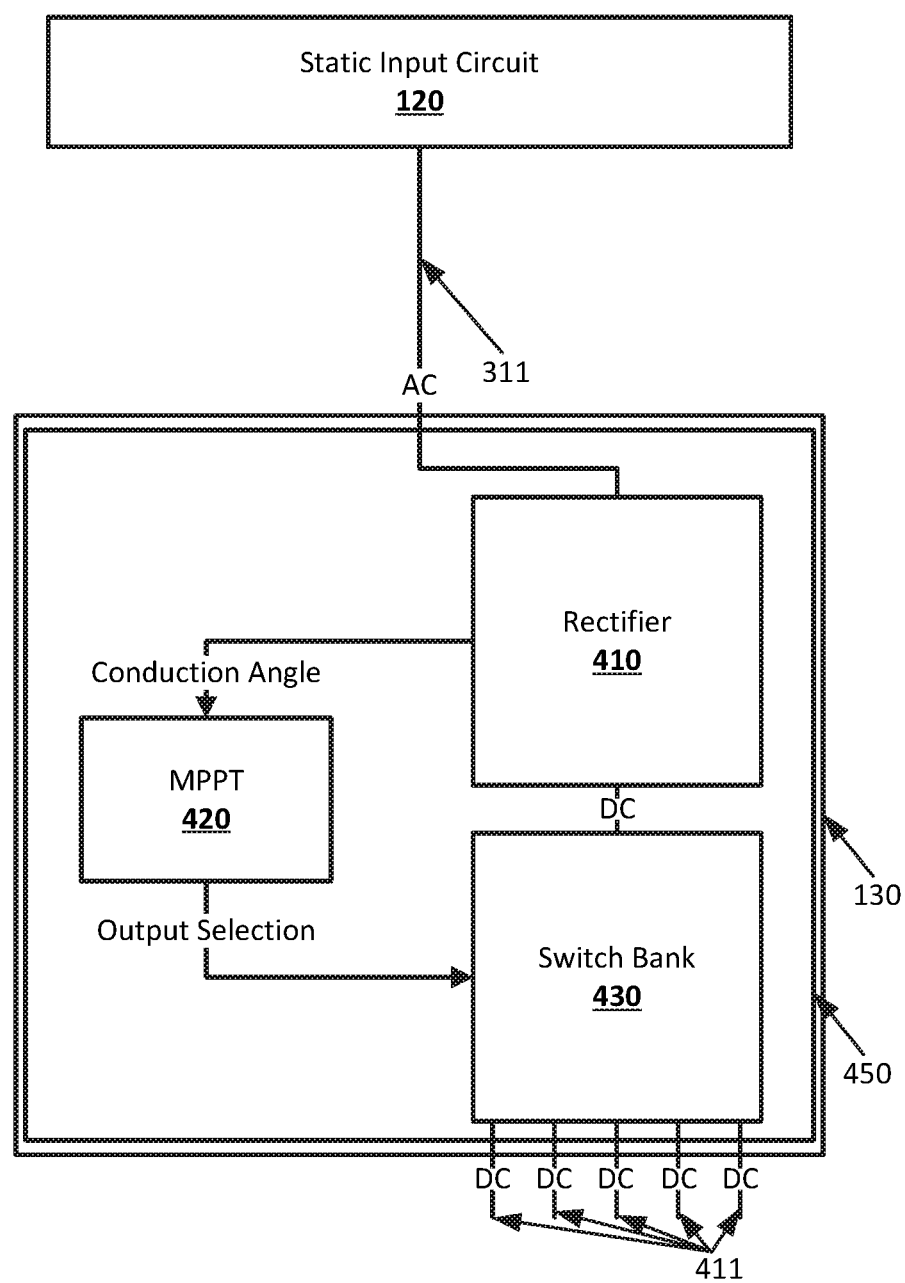
FIG. 4 shows an example system suitable for a power receiver circuit according to an implementation of the disclosed subject matter.

FIG. 4 shows an example system suitable for a power receiver circuit according to an implementation of the disclosed subject matter. The output 311 of the static input circuit 120 may carry AC to the rectifier circuit 130. The output 311 may be connected to a rectifier channel 450 of the rectifier circuit 130. The rectifier channel 450 may include a rectifier 410, an MPPT 420, and a switch bank 430. The rectifier 410 may receive the AC carried by the output 311, which may be the combined AC from the transducer elements 201, 202, 205, and 206, in the group 250. The rectifier 410 may convert the AC carried by the output 311 to DC. The rectifier may use a diode bridge, Schottky diodes, diode-connected FETS, or may be any form of synchronous rectifier.

The voltage of the DC output by the rectifier 410 may be controlled by the MPPT 420. The switch bank 430 may be connected to the output for the rectifier 410, and may include any suitable number of direct current outputs 411 which may each be assigned a different voltage level. The voltage of the DC output by the rectifier 410 may be determined by the output 411 of the switch bank 430 selected by the MPPT 420. The MPPT 420 may monitor the operation of the rectifier 410 and select an output of the switch bank 430 in any suitable manner. The selected output 411 may be based on the voltage level that will maximize the power transferred out of the rectifier channel 450. The MPPT 420 may monitor the conduction angle of the rectifier 410 and select an output 411 of the switch bank 430 in order to maintain the conduction angle within a specified range, may measure the open-circuit voltage of the AC carried by the output 311 to the rectifier 410 after temporarily disabling the rectifier 410 and select an output 411 from the switch bank 430 based on some fraction of the measured open-circuit voltage, or may, instead of directly monitoring the rectifier 410, iteratively select each of the available outputs 411 of the switch bank 430, measure the power transfer achieved through each of the outputs 411, and then select the output 411 that exhibits the maximum power transfer. The MPPT 420 may select an output 411 of the switch bank 430 at any suitable interval and at any suitable rate, and may leave an output 411 selected for any suitable length of time before selecting a different output 411.

The switch bank 430 may receive DC output by the rectifier 410, and may output the DC from the rectifier channel 450 using the output 411 selected by the MPPT 420. The outputs 411 may be assigned any suitable voltage levels. For example, the switch bank 430 may include five outputs 411, which may be 6 Volts, 10 Volts, 14 Volts, 18 Volts, and 22 Volts. The voltage level of the DC output by the rectifier 410 may be the voltage level assigned to the output 411 selected by the MPPT 420. For example, if the MPPT 420 selects the output 411 assigned 14 Volts, the DC output by the rectifier 410 to the switch bank 430 may be, or be within any suitable range of, 14 Volts. The rectifier 410 may not output at the voltage level of the selected output 411 immediately, for example, if a capacitor that charges using the DC output by the rectifier 410 is not sufficiently charged, and may reach the selected voltage when the capacitor has reached the appropriate charge level.

The rectifier 130 may have any suitable number rectifier channels, such as the rectifier channel 450. Each rectifier channel may receive AC from a separate group circuit of the static input circuit 120, and may output DC on an output selected from that rectifier channel's switch bank based on voltage level by that rectifier channel's MDPT. The voltage levels assigned to the outputs of the switch banks may be the same across each rectifier channel of the rectifier circuit 130. The outputs of the switch banks may be combined by assigned voltage level, so that the total number of outputs from the rectifier circuit 130 may be equal to the number of distinct voltage levels assigned to the outputs 411. For example, if the switch bank 430 has five outputs 411, the rectifier circuit 130 may have five outputs, which may combine the outputs 411 of the switch bank 430 with corresponding outputs assigned the same voltage from switch banks from other rectifier channels of the rectifier 130. For example, if the rectifier circuit 130 has ten rectifier channels and each rectifier channel's switch bank has five outputs 6 Volts, 10 Volts, 14 Volts, 18 Volts, and 22 Volts, the rectifier circuit 130 may have five outputs at 6 Volts, 10 Volts, 14 Volts, 18 Volts, and 22 Volts. The 6 Volt output from the rectifier channel may combine the 6 Volt outputs from the ten switch banks of the rectifier circuit 130. The 10 Volt output from the rectifier channel may combine the 10 Volt outputs from the ten switch banks of the rectifier circuit 130, and similarly for the 14 Volt, 18 Volt, and 22 Volt outputs.

The rectifier circuit 130 and rectifier channels, such as the rectifier channel 450, may be implemented in any suitable manner. For example, the rectifier circuit 130 may be implemented as an ASIC. Each rectifier channel, such as the rectifier channel 450 may be implemented in the ASIC for the rectifier circuit 130. The ASIC for the rectifier circuit 130 may be, for example, installed on the same PCB that includes the static input circuit 120.

Figure 5:
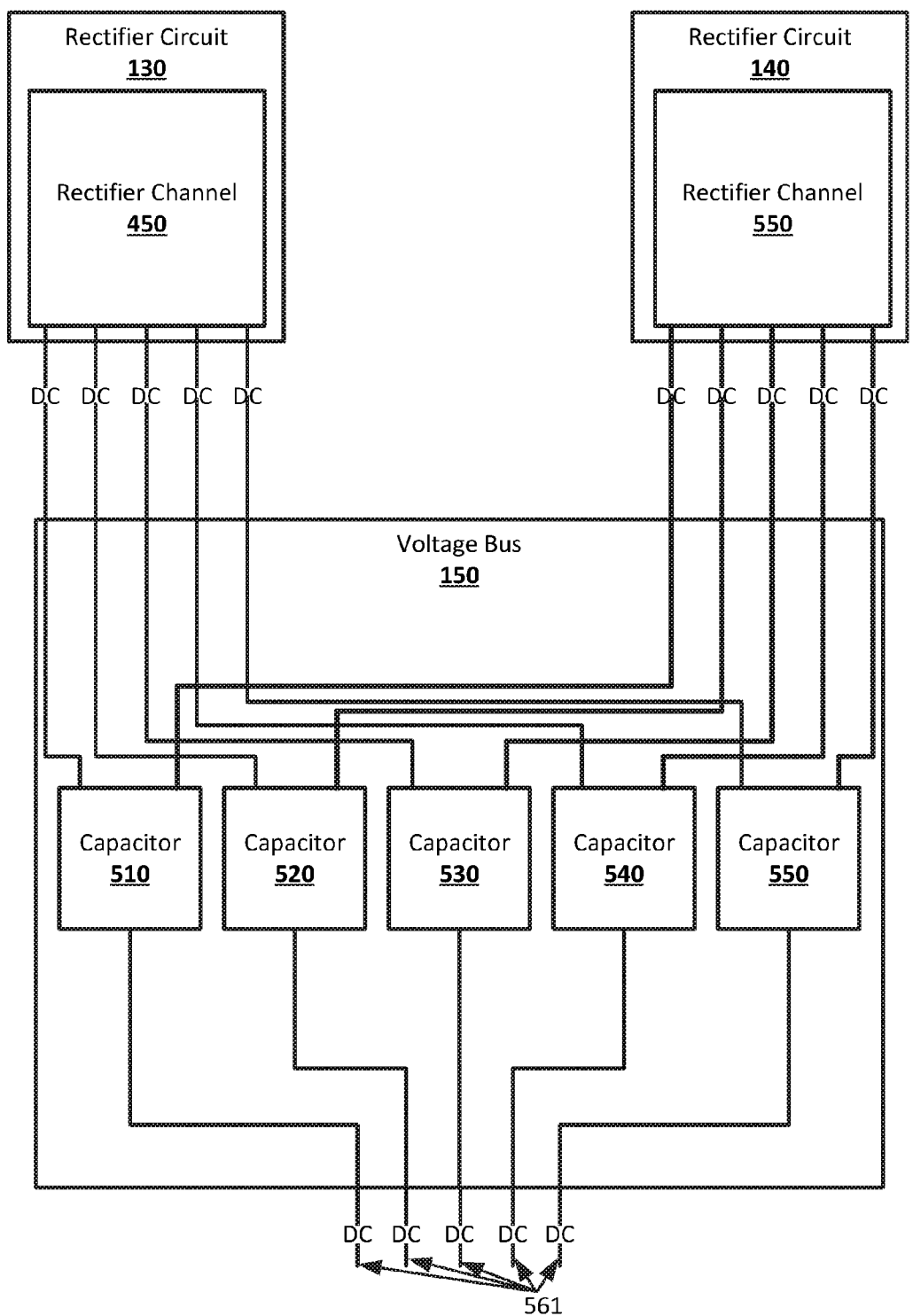
FIG. 5 shows an example system suitable for a power receiver circuit according to an implementation of the disclosed subject matter.

FIG. 5 shows an example system suitable for a power receiver circuit according to an implementation of the disclosed subject matter. The voltage bus 150 may be connected to the outputs of the rectifier circuits, such as the rectifier circuits 130 and 140. The voltage bus 150 may include a number of capacitors equal to the number of outputs from each rectifier circuit. For example, the voltage bus 150 may include capacitors 510, 520, 530, 540, and 550. Each of the capacitors 510, 520, 530, 540, and 550 may receive all of the outputs from the rectifier circuits at a particular voltage level. For example, if each of the rectifier circuits has five outputs at 6 Volts, 10 Volts, 14 Volts, 18 Volts, and 22 Volts, the capacitor 510 may receive all 6 Volt outputs, the capacitor 520 may receive all 10 Volt outputs, the capacitor 530 may receive all 14 Volt outputs, the capacitor 540 may receive all 18 Volt outputs, and the capacitor 550 may receive all 22 Volt outputs. Each of the capacitors 510, 520, 530, 540, and 550 may charge using the DC carried by the outputs from the rectifier circuits, and may output DC on the outputs 561. The voltage of the DC carried on the output 561 for one of the capacitors 510, 520, 530, 540, or 550 may be the voltage of the outputs from the rectifier circuits connected to that capacitor when that capacitor is sufficiently charged.

Figure 6:
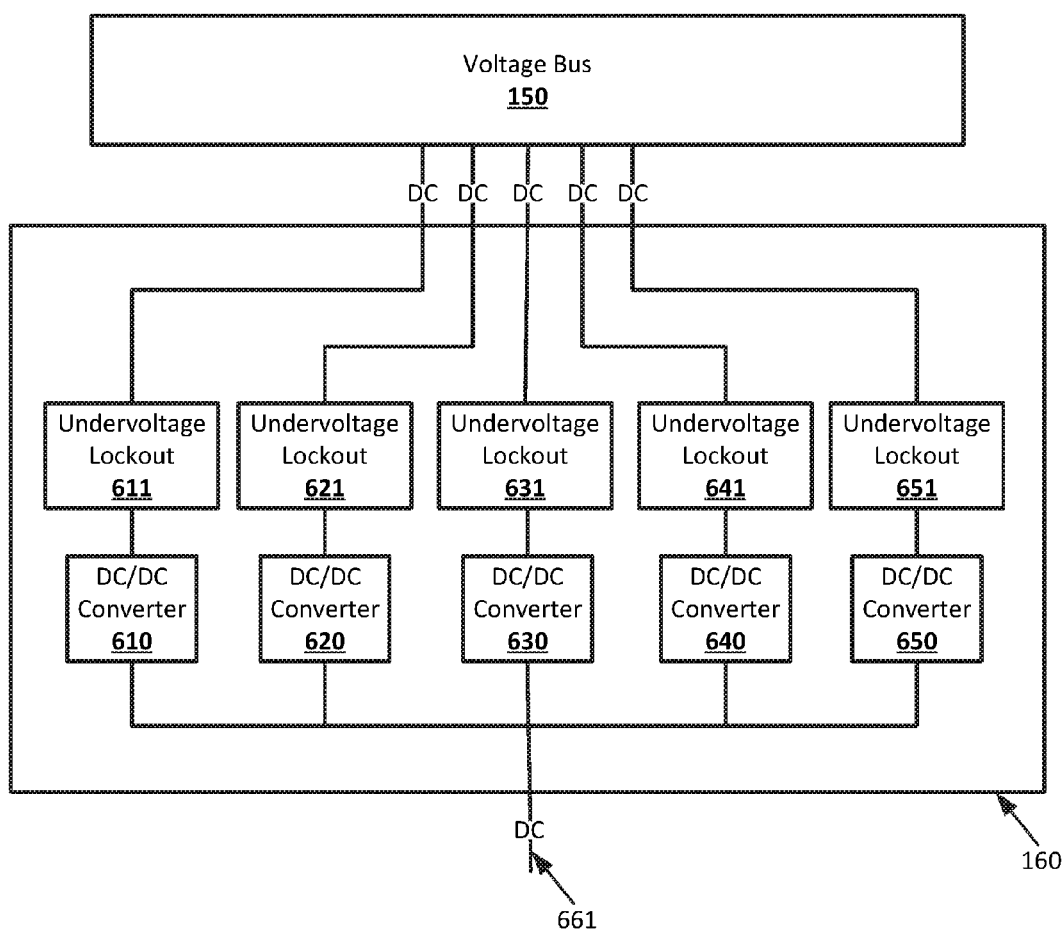
FIG. 6 shows an example system suitable for a power receiver circuit according to an implementation of the disclosed subject matter.

FIG. 6 shows an example system suitable for a power receiver circuit according to an implementation of the disclosed subject matter. The outputs from the voltage bus 150 may carry DC to the voltage conversion 160. The voltage conversion 160 may include a number of DC/DC converters equal to the number of capacitors of the voltage bus 150. For example, the voltage conversion 160 may include DC/DC converters 610, 620, 630, 640, and 650. The outputs from the voltage bus 150 may be connected to undervoltage lockouts, which may in turn be connected to the DC/DC converters. For example, the undervoltage lockouts 611, 621, 631, 641, and 651 may each receive one of the outputs from the voltage bus 150, and may be connected to a respective one of the capacitors 610, 620, 630, 640, and 650. The undervoltage lockouts 611, 621, 631, 641, and 651 may detect voltage levels of the output from the capacitors 510, 520, 530, 540, and 550, respectively, of the voltage bus 150, and may disconnect respective DC/DC converter 610, 620, 630, 640, or 650 if the voltage level drops below a threshold, and reconnect respective DC/DC converter 610, 620, 630, 640, or 650 when the voltage level returns above the threshold. This may allow the undervoltage lockouts 611, 621, 631, 641, and 651 to maintain the voltage levels assigned to the outputs, such as the outputs 411, of each of the switch banks, such as the switch bank 430, and cause the rectifiers, such as the rectifier 410, to output DC at the voltage levels assigned to the outputs currently selected from the switch banks connected to the rectifiers.

For example, the capacitor 510 may receive the 6 Volt outputs from the rectifier circuits. The undervoltage lockout 611 may monitor the voltage of the DC output by the capacitor 510. The undervoltage lockout 611 may break the connection between the DC/DC converter 610 and the capacitor 510 that goes through the undervoltage lockout 611 if the voltage level of the DC output by the capacitor 510 falls below a threshold, which may be 6 Volts, or may be under 6 Volts by any suitable amount. This may allow the capacitor 510 to charge from the DC output by the rectifier circuits. The undervoltage lockout may reconnect the DC/DC converter 610 to the capacitor 510 when the voltage level of the DC output by the capacitor 510 has returned to the threshold, or to some level above the threshold, for example, after the capacitor is sufficiently charged. The undervoltage lockout 611 may maintain the assigned voltage level between the DC/DC converter 610, the 6 Volt output 411 of the switch bank 430 that was assigned the voltage level of 6 Volts, and the rectifier 410 when the MPPT 420 selects the 6 Volt output 411.

The DC/DC converters 610, 620, 630, 640, and 650 may convert DC at respective voltage levels, for example, as set by the undervoltage lockouts 611, 621, 631, 641, and 651, to the DC of the same voltage level, which may be a target voltage level for the power receiver circuit 100. For example, the DC/DC converters 610, 620, 630, 640, and 650 may convert, respectively, 6 Volt DC, 10 Volt DC, 14 Volt DC, 18 Volt DC, and 22 Volt DC to 5 Volt DC. The DC of the same voltage level output from the DC/DC converters 610, 620, 630, 640, and 650 may be combined and carried out of the voltage conversion 160 by the output 661. The output 661 may carry DC at the target voltage level, for example 5 Volts, out of the power receiver circuit 100 and to a circuit that may utilize the DC in any suitable manner. For example, the output 661 may carry DC to a charging circuit for a battery, where the DC may be used to charge the battery. The DC carried by the output 661 may also be used, for example, to power any suitable electronic or electric component, including, for example, microcontrollers, microprocessors, ASICS, FPGAs, actuators, switches, and motors.

Figure 7:
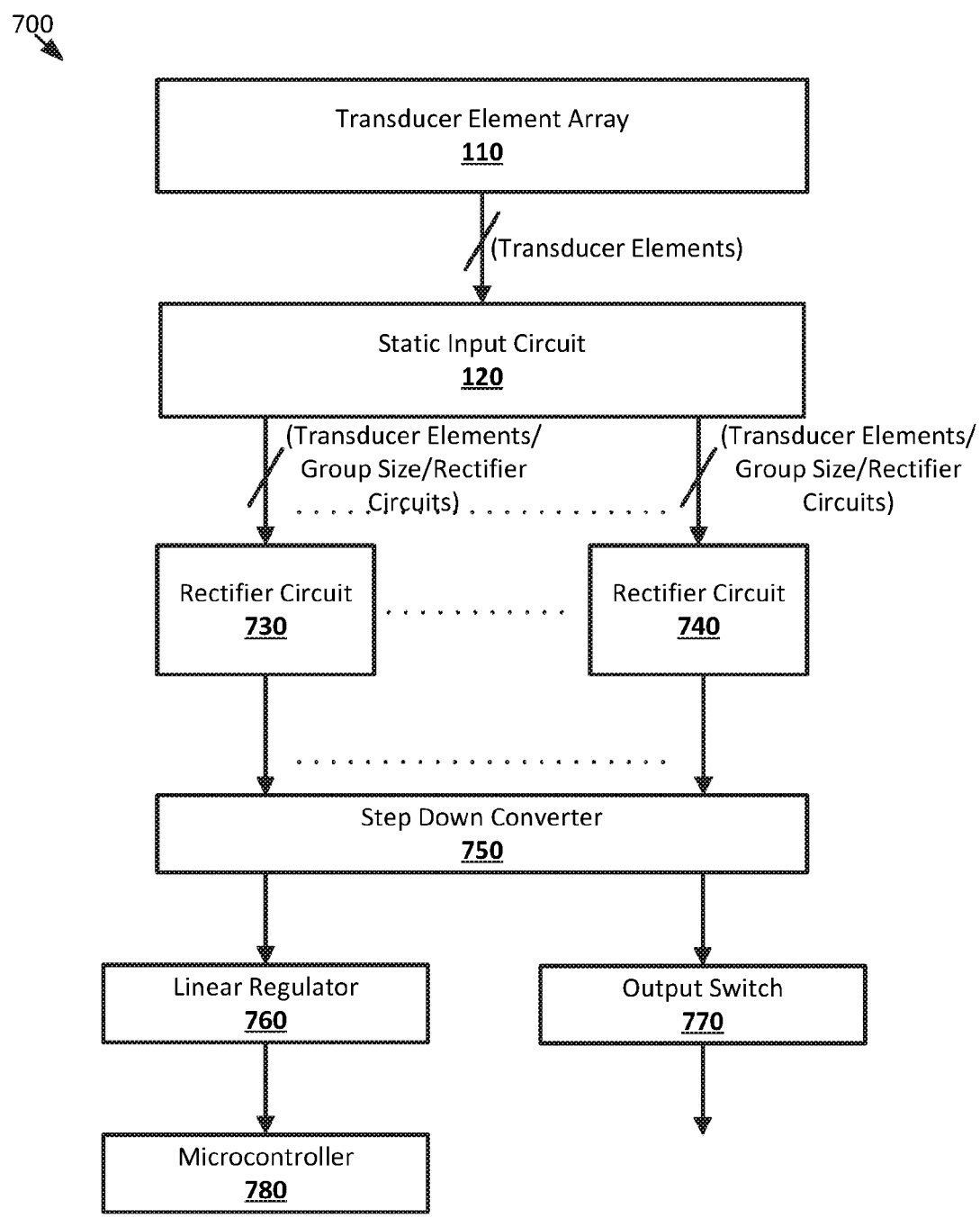
FIG. 7 shows an example system suitable for a power receiver circuit according to an implementation of the disclosed subject matter.

FIG. 7 shows an example system suitable for a power receiver circuit according to an implementation of the disclosed subject matter. A power receiver circuit 700 may include the transducer element array 110, the static input circuit 120, rectifier circuits 730 and 740, a step down converter 750, a linear regulator 760, an output switch 770, and a controller 780. The power receiver circuit 700 may be able to receive power transmitted wirelessly, for example, through optical, ultrasonic, or RF transmission, using the transducer element array 110.

The transducer element array 110 may have a number of outputs for current equal to the number of elements in the transducer element array 110. The elements of the transducer element array 110 may each output current to the static input circuit 120. The static input circuit 120 may combine, in parallel, the currents output from the elements of the transducer element array 110. The currents may combined in any suitable manner. For example, the static input circuit 120 may combine the currents output from separate groups of elements of the transducer element array 110, with each group of elements having its own separate output from the static input circuit 120. The outputs of the static input circuit 120 may be connected to rectifier circuits, including the rectifier circuits 730 and 740. The current carried by the outputs of the static input circuit 120 may be AC.

The power receiver circuit 700 may include any suitable number of rectifier circuits. The outputs from the static input circuit 120 may be divided among the available rectifier circuits, including the rectifier circuits 730 and 740, in any suitable manner. For example, each rectifier circuit may be connected to the same number of distinct outputs from the static input circuit 120. Each rectifier circuit may have a single output. The voltage carried by the output from each rectifier circuit may vary. The outputs from the rectifier circuits may be combined and connected to the step down converter 750. The current carried by the outputs of the rectifier circuits may be DC, converted from the AC input into the rectifier circuits from the static input circuit 120.

The step down converter 750 may be any suitable step down converter or transformer, and may convert the DC carried by the output from the rectifiers, including the rectifiers 730 and 740, to a specified, target, voltage level. For example, the step down converter 750 may convert received DC of any voltage level to DC of 5 Volts. The output of the step down converter 160 may be connected to the linear regulator 760 and the output switch 770.

The linear regulator 760 may convert DC received from the step down converter 750 to a DC of a voltage level suitable for operating the microcontroller 780. The microcontroller 780 may operate off the DC supplied through the linear regulator 760, and may monitor various voltage and amperage levels of the power receiver circuit 700. The microcontroller 780 may control the output switch 770, enabling and disabling the output switch 770.

The output switch 770 may be used to provide power to another device or mechanism, such as, for example, a charging circuit which may charge a battery. When the output switch 770 is enabled, DC from the step down converter 750 may be allowed to exit the power receiver circuit 700 through the output switch 770, where it may be utilized by another circuit. When the output switch 770 is disabled, no current may flow out of the power receiver circuit 700.

Figure 8:
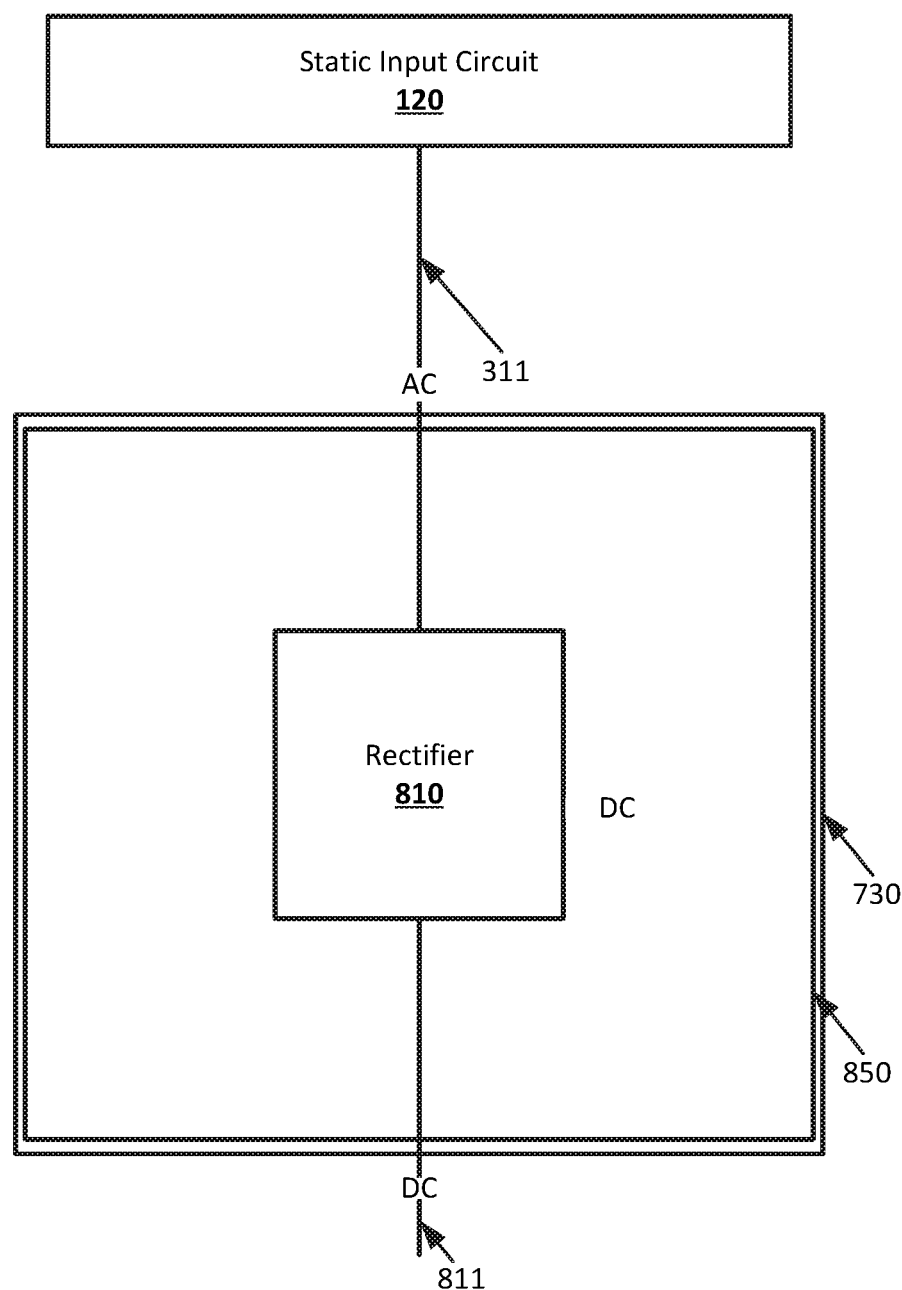
FIG. 8 shows an example system suitable for a power receiver circuit according to an implementation of the disclosed subject matter.

FIG. 8 shows an example system suitable for a power receiver circuit according to an implementation of the disclosed subject matter. The output 311 of the static input circuit 120 may carry AC to the rectifier circuit 730. The output 311 may be connected to a rectifier channel 850 of the rectifier circuit 130. The rectifier channel 850 may include a rectifier 810. The rectifier 810 may receive the AC carried by the output 311, which may be the combined AC from the transducer elements 201, 202, 205, and 206, in the group

250. The rectifier 810 may convert the AC carried by the output 311 to DC. The rectifier may use a diode bridge, Schottky diodes, diode-connected FETS, or may be any form of synchronous rectifier. The voltage of the DC output by the rectifier 810 on the output 811 may be the voltage level that will maximize the power transferred out of the rectifier channel 850.

The rectifier 730 may have any suitable number rectifier channels, such as the rectifier channel 850. Each rectifier channel may receive AC from a separate group circuit of the static input circuit 120, and may output DC on a single output. The outputs of the rectifier channels may be combined so that the rectifier circuit 730 has one output, which may carry a DC current with a varying voltage. For example, the rectifiers, such as the rectifier 810, of the rectifier channels, may be connected in serial through their outputs.

The rectifier circuit 730 and rectifier channels, such as the rectifier channel 80, may be implemented in any suitable manner. For example, the rectifier circuit 730 may be implemented as an ASIC. Each rectifier channel, such as the rectifier channel 850 may be implemented in the ASIC for the rectifier circuit 730. The ASIC for the rectifier circuit 730 may be, for example, installed on the same PCB that includes the static input circuit 120.

Figure 9:
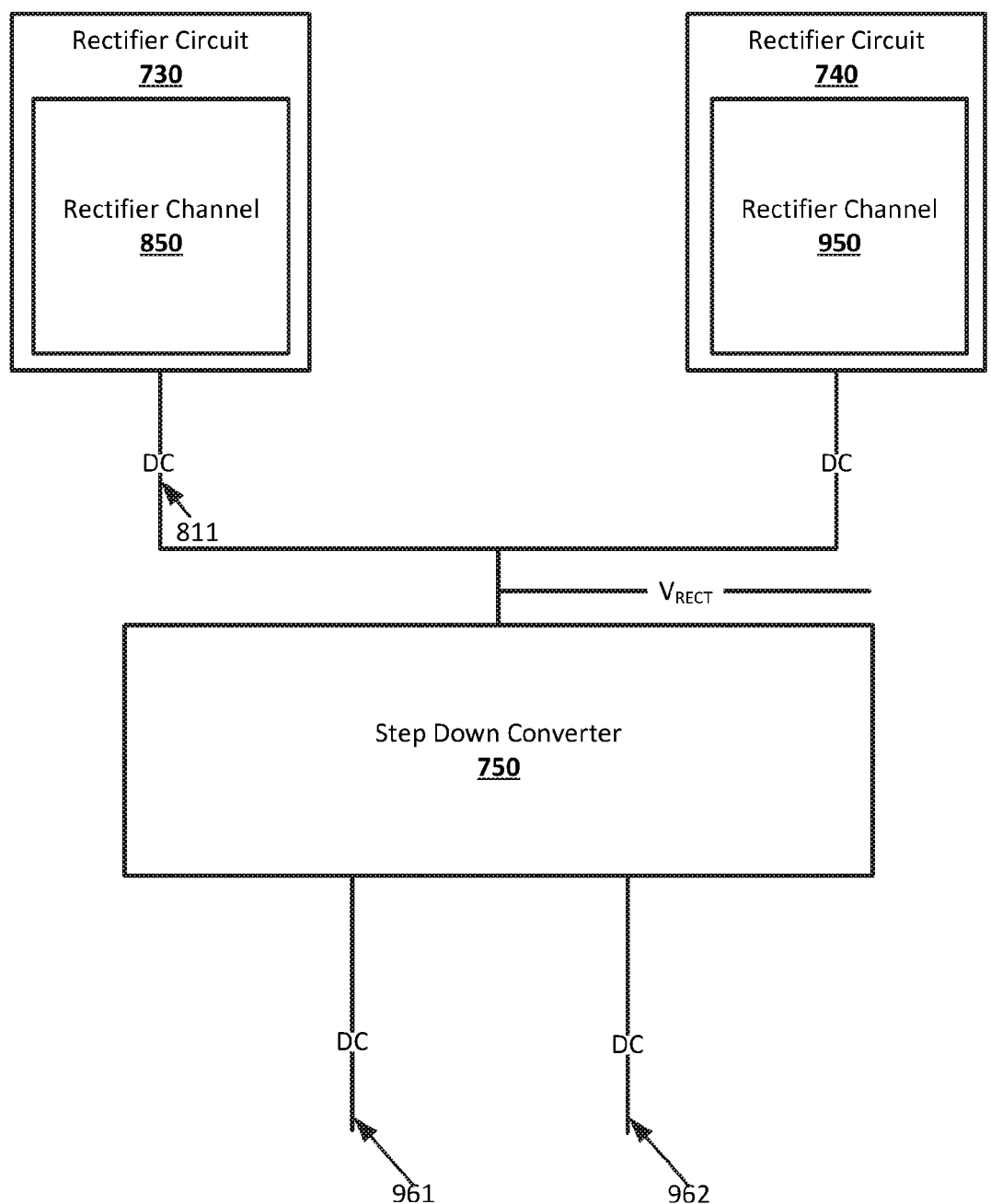
FIG. 9 shows an example system suitable for a power receiver circuit according to an implementation of the disclosed subject matter.

FIG. 9 shows an example system suitable for a power receiver circuit according to an implementation of the disclosed subject matter. The step down converter 750 may be connected to the outputs, such as the output 811, of the rectifier circuits, such as the rectifier circuits 730 and 740. The step down converter 750 may receive the DC output from all of the rectifier channels, such as the rectifier channels 850 and 950, of the rectifier circuits, such as the rectifier circuits 730 and 740. The step down converter 750 may be a converter or transformer of any suitable type, and may convert DC of any voltage level received from the rectifier circuits to DC having a target voltage level, such as, for example, 5 Volts. The step down converter 750 may output DC at the target voltage level. The output from the step down converter 750 may be split, inside or outside of the step down converter 750, to outputs 961 and 962. The DC input into the step down converter 750 from the rectifier circuits may have a voltmeter connected in parallel that may be used to measure the voltage of the output from the rectifier circuits, $V_{RECT}$.

Figure 10:
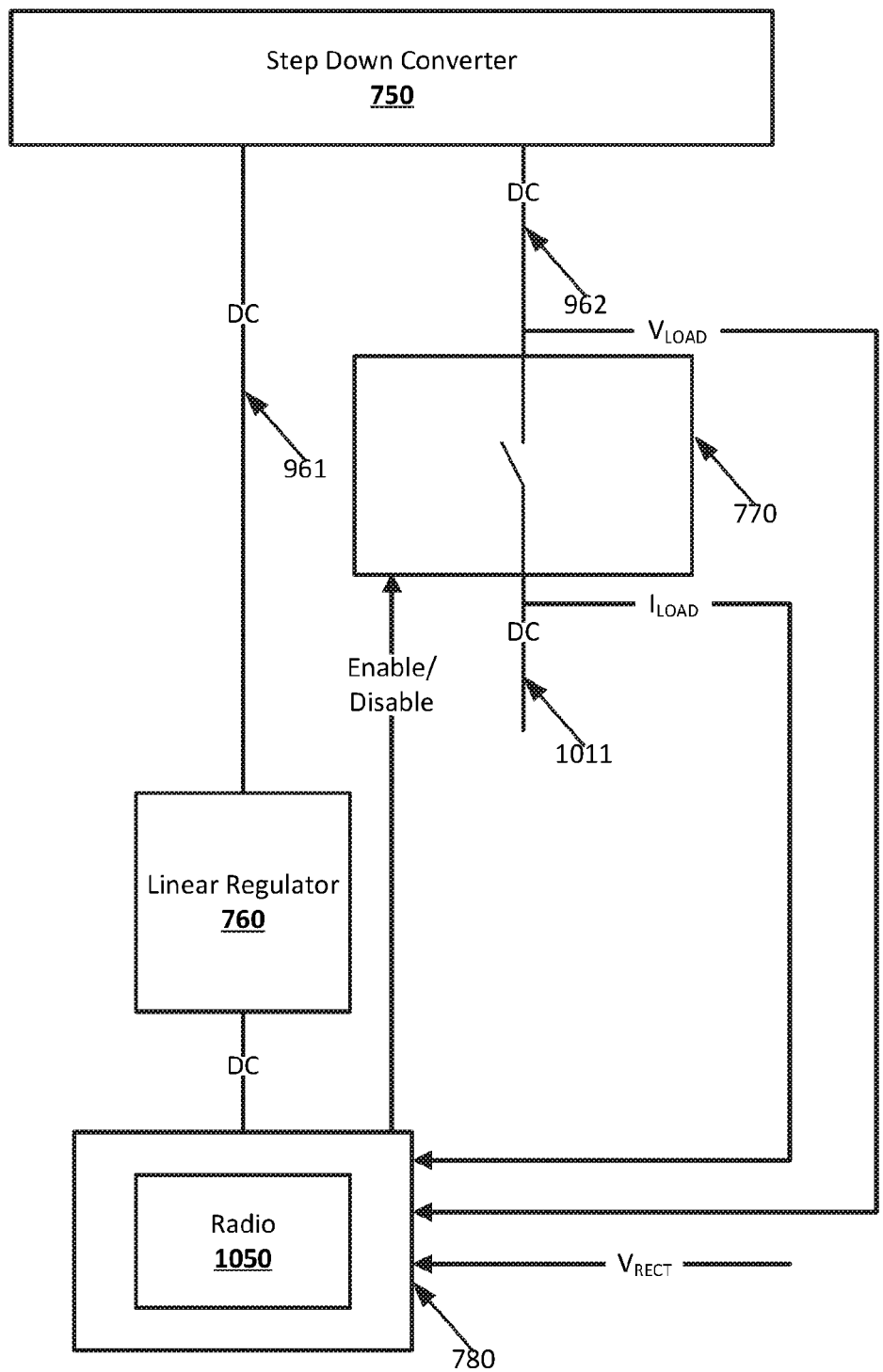
FIG. 10 shows an example system suitable for a power receiver circuit according to an implementation of the disclosed subject matter.

FIG. 10 shows an example system suitable for a power receiver circuit according to an implementation of the disclosed subject matter. The linear regulator 760 may receive DC carried by the output 961 from the step down converter 750. The linear regulator 760 may be any suitable device, component, or circuit to convert the DC output by the step down converter 750 to DC of a native voltage level for the microcontroller 780. The output of the linear regulator 760 may be connected to the microcontroller 780. When the linear regulator 760 receives DC of an appropriate voltage level from the step down converter 750, the linear regulator 760 may output enough power at an appropriate voltage to operate the microcontroller 780.

The output switch 770 may receive DC carried by the output 962 from the step down converter 750. The output 1011 of the output switch 770 may be the output for the power receiver circuit 700, and may carry DC which may be used by any suitable electric or electronic component, such as, for example, a charging circuit for a battery, microcontrollers, microprocessors, ASICS, FPGAs, actuators, switches, and motors. When the output switch 770 is closed, the output 1011 may carry DC out of the power receiver circuit 700. When the output switch 770 is open, no DC may be carried out of the power receiver circuit 700 on the output 1011. The opening and closing of the output switch 770 may be controlled by the microcontroller 780.

The microcontroller 780 may be any suitable electronic microcontroller, and may include an integrated analog-to-digital converter and radio 1050. The microcontroller 780 may be powered by DC from the linear regulator 760. The microcontroller 780 may monitor the operation of the power receiver circuit 700. A voltmeter may be connected in parallel with the step down converter 750, and may measure the voltage $V_{RECT}$ of the DC being output from the rectifier circuits. The measurement of the voltage $V_{RECT}$ of the DC being output from the rectifier circuits, such as the rectifier circuits 730 and 640, into the step down converter 750, may be input into the microcontroller 780. The voltmeter for measuring $V_{RECT}$ may be implemented as part of the microcontroller 780, or separately from the microcontroller 780, with the microcontroller 780 receiving the measurements output by the voltmeter. A voltmeter may be connected in parallel with the output switch 770, and may measure the voltage $V_{LOAD}$ of the DC being output from the step down converter 750 to the output switch 770. The measurement of the voltage $V_{LOAD}$ of the DC being output from the step down converter 750 may be input into the microcontroller 780. The voltmeter for measuring $V_{LOAD}$ may be implemented as part of the microcontroller 780, or separately from the microcontroller 780, with the microcontroller 780 receiving the measurements output by the voltmeter. An ammeter may be connected to the output 1011 from the output switch 770, and may measure the amperage $I_{LOAD}$ of the DC being output from the output switch 770. The measurement of the amperage $I_{LOAD}$ of the DC being output from the output switch 770 may be input into the microcontroller 780. The ammeter for measuring $I_{LOAD}$ may be implemented as part of the microcontroller 780, or separately from the microcontroller 780, with the microcontroller 780 receiving the measurements output by the ammeter.

The microcontroller 780 may use the radio 1050 to communicate with a transmitting device that transmits wireless power to the transducer element array 110, for example to report $V_{RECT}$, $V_{LOAD}$, and $I_{OUT}$, so that the transmitting device may adjust the delivery of wireless power to the transducer element array 110. The microcontroller 780 may control the opening and closing of the output switch 770, for example, through an enable/disable line. The microcontroller 780 may open and close the output switch 770 based on any suitable criteria, including, for example, based on instructions received through the radio 1050, or based on the measurements of $V_{RECT}$, $V_{LOAD}$, and $I_{OUT}$.

Figure 11:
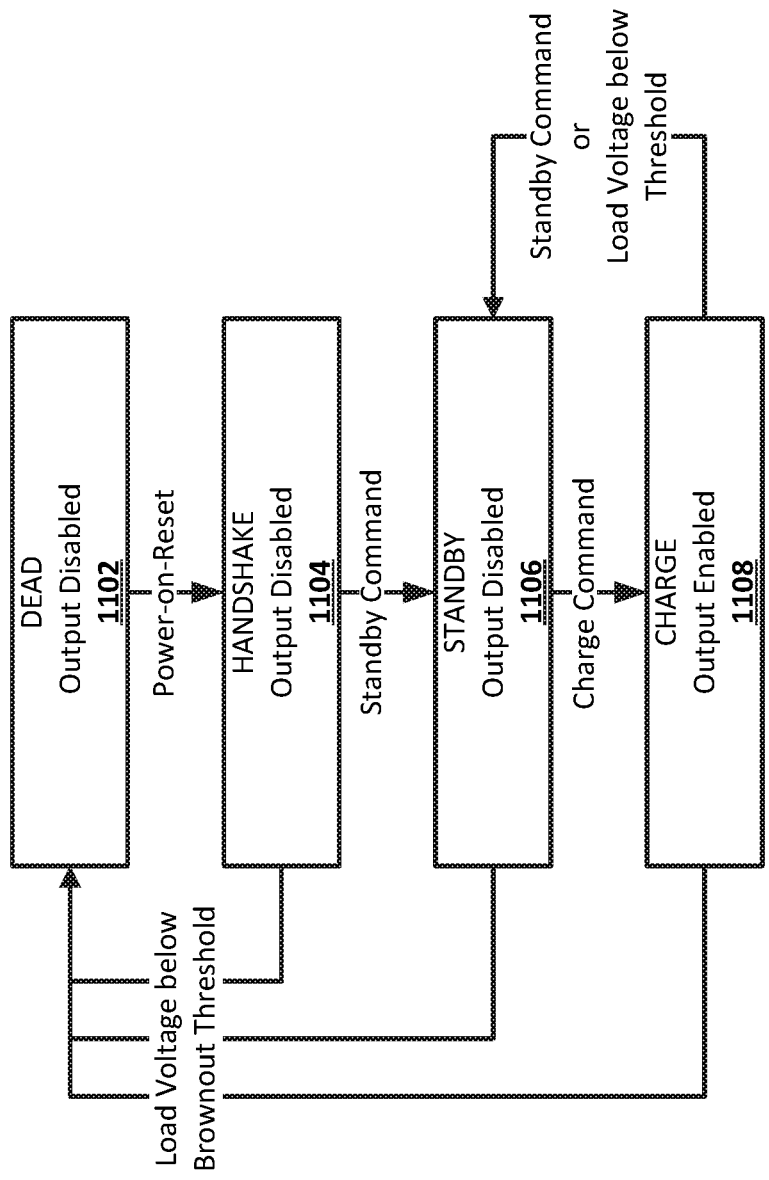
FIG. 11 shows an example arrangement suitable for a power receiver circuit according to an implementation of the disclosed subject matter.

FIG. 11 shows an example arrangement suitable for a power receiver circuit according to an implementation of the disclosed subject matter. The microcontroller 780 may implement a state machine which may include a DEAD state 1102, HANDSHAKE state 1104, STANDBY state 1106, and CHARGE state 1106. The microcontroller 780 may be in the DEAD state 1102 when not enough power is delivered by the linear regulator 760 to operate the microcontroller 780. For example, the transducer element array 110 may not generate enough power to generate sufficient current and voltage through the step down converter 750 to operate the microcontroller 780. When the microcontroller 780 is in the DEAD state 1102, the output switch 770 may be open, and the output 1011 may not carry any current out of the power receiver circuit 700. The microcontroller 780 may exit the DEAD state 1102 and enter the HANDSHAKE state 1104 when sufficient power is supplied to the microcontroller 780 by the linear regulator 760. For example, when the transducer element array 110 generates enough power to provide DC of sufficient voltage to the microcontroller 780 through the rectifier circuits, the step down converter 750, and linear regulator 760, the microcontroller 780 may generate a power-on-reset signal and enter the HANDSHAKE state 1104.

In the HANDSHAKE state 1104, the microcontroller 780 may use the radio 1050 to communicate with the transmitting device. The radio 1050 may communicate any suitable data to the transmitting device, including, for example, data regarding characteristics of the transducer element array 110 that may be used by the transmitting device to adjust various aspects of power delivered to the transducer element array 110. For example, the radio 1050 may communicate data that indicates the presence of the transducer element array 110, the location of the transducer element array 110, and may authenticate the power receiver circuit 700 to the transmitting device, which may only transmit power to the transducer element array 110 of an authenticated power receiver circuit 700. When the microcontroller 780 is in the STANDBY state 1104, the output switch 770 may be open, and the output 1011 may not carry any current out of the power receiver circuit 700. Once communication has been established with the transmitting device, the microcontroller 780 may enter the STANDBY state 1106. The microcontroller 780 may enter the STANDBY state 1106 in response to receiving an instruction, TX_STBY, from the transmitting device.

In the STANDBY state 1106, the microcontroller 780 may use the radio 1050 to communicate with the transmitting device. The communication may be periodic, and may include any suitable data, such as, for example $V_{RECT}$ and $V_{LOAD}$ values as determined by the microcontroller 780. When the microcontroller 780 is in the STANDBY state 1106, the output switch 770 may be open, and the output 1011 may not carry any current out of the power receiver circuit 700. The transmitting device may use the data received from the microcontroller 780 to adjust the delivery of power to the transducer element array 110 in any suitable manner. For example, the transmitting device may adjust the phase, amplitude, focus, and steering of an ultrasonic beam directed at an ultrasonic transducer array. The transmitting device may determine the minimum amount of power that can be delivered to the transducer element array 110 to allow the power receiver circuit 700 to output a useful amount of power. For example, the transmitting device may determine the minimum amount of power needed to allow the power receiver circuit 700 to charge a device battery through a charging circuit that receives power output by the power receiver circuit 700 through the output 1011 of the output switch 770. The transmitting device may, for example, compare received $V_{RECT}$ values to the predetermined threshold for rectifier voltage $V_{RECT\_TH}$ and determine the minimum power that can be delivered to the transducer element array 110 to maintain $V_{RECT} > V_{RECT\_TH}$ at the output of the rectifier circuits, such as the rectifier circuits 730 and 740. When the transmitting device has determined the minimum power that it needs to deliver, the transmitting device may instruct the microcontroller 780 to enter the CHARGE state 1108, for example, sending an instruction TX_CHARGE, to the microcontroller 780 through the radio 1050.

In the CHARGE state 1108, the microcontroller 780 may cause the output switch 770 to close, allowing the power receiver circuit 700 to deliver power to a suitable circuit, such as a charging circuit for a battery, connected to the output 1011 of the output switch 770. The power delivered by the closed output switch 770 through the output 1011 may have the same voltage level $V_{LOAD}$ as the DC output from the step down converter 750, which may be, for example, 5 Volts, and may have amperage $I_{LOAD}$. The microcontroller 780 may continue to communicate with the transmitting device through the radio 1050 while in the CHARGE state 1108. For example, the microcontroller 780 may send $V_{RECT}$, $V_{LOAD}$, and $I_{LOAD}$ values to the transmitting device, which may make adjustments to the power delivered to the transducer element array 110 to maintain $V_{RECT}$, $V_{LOAD}$, and $I_{LOAD}$ at desired values.

The transmitting device may instruct the microcontroller 780 exit the CHARGE state 1108 and return to the STANDBY state 1106, for example, sending the command TX_STBY, to the microcontroller 780 through the radio 1050. The transmitting device may cause the microcontroller 780 to exit the CHARGE state 1108, for example, if the value of $I_{LOAD}$ drops below a predetermined threshold, which may indicate that power is no longer needed by the circuit connected to the output 1011 of the output switch 770. For example, a battery being charged by a charging circuit connected to the output 1011 of the output switch 770 may be fully charged. The transmitting device may cause the microcontroller 780 to exit the CHARGE state 1108 and enter the STANDBY state 1106 if the transmitting device intends to stop delivering power to the transducer element array 110 for any suitable reason. The microcontroller 780 may also exit the CHARGE state 1108 if $V_{LOAD}$ falls below the predetermined threshold $V_{LOAD\_TH\_FALL}$, which may be an indication that step down converter 750 can no longer maintain $V_{LOAD}$ in regulation at the appropriate voltage level. The microcontroller 780 may exit the CHARGE state 1108, enter the STANDBY state 1106, and send a message RX_VLOAD_FAIL indicating that $V_{LOAD}$ dropped to the transmitting device. Whenever the microcontroller 780 exits the charge state, the microcontroller 780 may cause the output switch 770 to open.

The microcontroller 780 may return to the DEAD state 1102 from the HANDSHAKE state 1104, STANDBY state 1106, and CHARGE state 1108. For example, the voltage VDD of the power supplied to the microcontroller 780 through the linear regulator 760 may drop below the brown-out threshold VDD_TH_FALL for the microcontroller 780, which may result in the microcontroller 780 entering the DEAD state 1102 from whatever state is in at the time the drop in VDD occurs. Drops in VDD may occur, for example, due to interruption in the power being delivered to the transducer element array 110 from the transmitting device. For example, an ultrasonic beam may be blocked from reaching an ultrasonic transducer array by an obstructing object, or the amount of power delivered may be reduced due to environmental interference.

Figure 12:
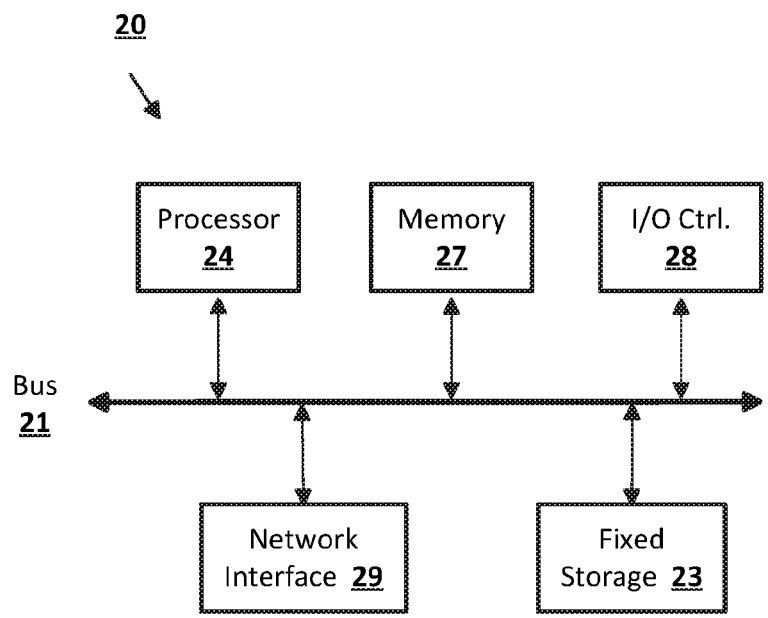
FIG. 12 shows a computer according to an embodiment of the disclosed subject matter.

Embodiments of the presently disclosed subject matter may be implemented in and used with a variety of component and network architectures. FIG. 12 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 13.

Many other devices or components (not shown) may be connected in a similar manner, such as document scanners, digital cameras, auxiliary, supplemental, or backup systems, or the like. Conversely, all of the components shown in FIG. 12 need not be present to practice the present disclosure. The components can be interconnected in different ways from that shown. The operation of a computer such as that shown in FIG. 12 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 13:
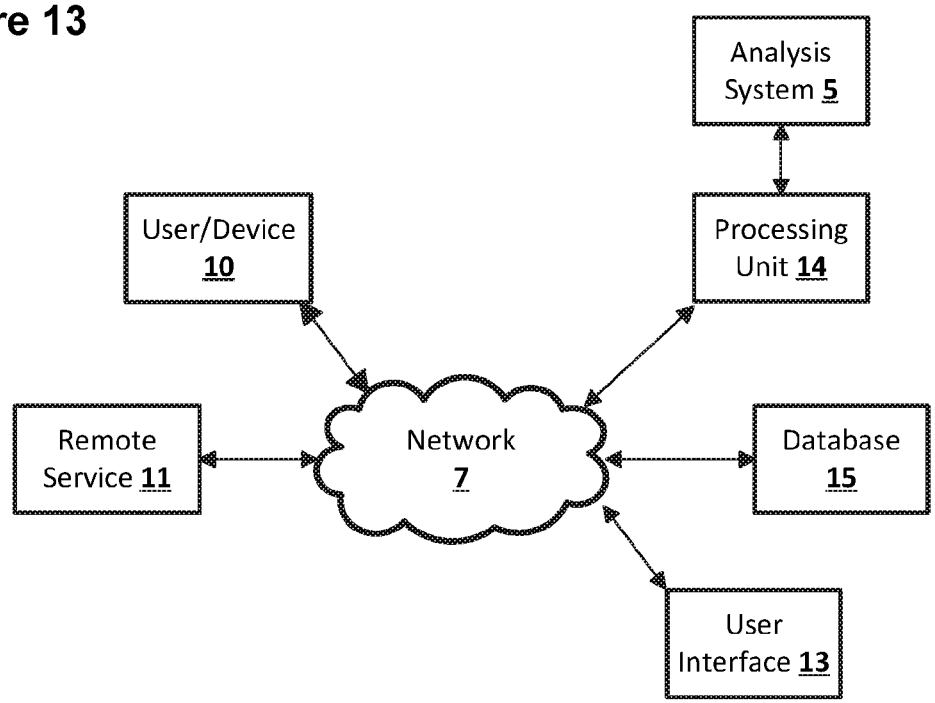
FIG. 13 shows a network configuration according to an embodiment of the disclosed subject matter.

FIG. 13 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A power receiver circuit device comprising:
a power generating mechanism comprising power generating elements configured to generate alternating current signals;
one or more group circuits, each group circuit connecting a group of power generating elements in parallel in an electrical circuit to combine the alternating current signals from the power generating elements in the group into a single alternating current signal;
one or more rectifier circuits, each rectifier circuit comprising one or more rectifier channels, each rectifier channel connected to one of the group circuits, wherein each rectifier channel comprises a rectifier configured to generate a direct current signal from the alternating current signal, a switch bank comprising two or more outputs, and a maximum power point tracker (MPPT);
a voltage bus comprising two or more capacitors, each capacitor connected to one or more of the rectifier circuits;
two or more undervoltage lockouts, each undervoltage lockout having an input connected to one of the capacitors and an output, each of the two or more undervoltage lockouts configured to disconnect its output when a voltage level input to the undervoltage lockout drops below a predetermined threshold, and wherein the predetermined threshold is different for at least two of the or more undervoltage lockouts; and
two or more DC/DC converters, each DC/DC converter connected to one of the undervoltage lockouts, each DC/DC converter configured to convert a direct current signal of a predetermined voltage level to a direct current signal of a target voltage level, wherein the predetermined voltage level is different for at least two of the two or more DC/DC converters.

2. The device of claim 1, wherein one of the rectifier channels is configured to receive the single alternating current signal from the group circuit to which the rectifier channel is connected and provide a direct current signal to the switch bank of the rectifier channel, and wherein the MPPT of the rectifier channel is configured to select one of the two or more outputs of the switch bank to output the direct current signal received from the rectifier of the rectifier channel.

3. The device of claim 2, wherein each of the two or more outputs of the switch bank has an assigned voltage level, and wherein the MPPT selects one of the two or more outputs of the switch bank based on the assigned voltage level that maximizes power transfer through the rectifier.

4. The device of claim 2, wherein each of the two or more outputs of the switch bank has an assigned voltage level, and wherein the MPPT selects one of the two or more outputs of the switch bank based on one or more of a conduction angle of the rectifier, open-circuit voltage of the single alternating current signal from the group circuit, and observed power transfer through each of the two or more outputs of the switch bank.

5. The device of claim 1, wherein one of the rectifier circuits further comprises two or more rectifier channels comprising switch banks, the switch banks of the rectifier channels comprising the same number of outputs, and wherein the one of the rectifier circuits further comprises a number of outputs equal to the number of outputs of one of the switch banks.

6. The device of claim 5, wherein the outputs of the switch bank of one of the two or more rectifier channels are each assigned a different voltage level, and wherein the outputs of the switch banks of the other of the two or more rectifier channels are assigned the same different voltage levels as the outputs of the switch bank of the one of the two or more rectifier channels.

7. The device of claim 6, wherein each of the number of outputs of the one of the rectifier circuits is assigned one of the different voltage levels, and wherein the an output of the one of the rectifier circuits comprises the outputs of the switch banks of the two or more rectifier channels assigned the same one of the different voltage levels as the output of the one of the rectifier circuits.

8. The device of claim 7, wherein one of the two or more capacitors is connected to one output from each of two or more rectifier circuits, and wherein each of the outputs has the same assigned one of the different voltage levels.

9. The device of claim 8, wherein one of the two more undervoltage lockouts is connected to the one of the two or more capacitors, and wherein the undervoltage lockout is further connected to one of the two or more DC/DC converters.

10. The device of claim 9, wherein the one of the two or more undervoltage lockouts is configured to disconnect its output into the one of the two or more DC/DC converters when a voltage level of a direct current signal input to the one of the two or more undervoltage lockouts drops below the predetermined threshold, and wherein the predetermined threshold is based on the one of the different voltage levels assigned to the outputs of the rectifier circuits connected to the one of the two or more capacitors.

11. The device of claim 9, wherein the one off the two or more DC/DC converters is configured to convert a direct current signal of the predetermined voltage level to a direct current signal of the target voltage level, wherein the predetermined voltage level is based on the one of the different voltage levels assigned to the outputs of the rectifier circuits connected to the one of the two or more capacitors.

12. The device of claim 1, wherein the power generating mechanism comprises a transducer array, and wherein the power generating elements comprise transducers.

13. The device of claim 12, wherein the transducer array is an ultrasonic transducer array, and wherein the transducers are ultrasonic transducers.

14. A power receiver circuit device comprising:
a power generating mechanism comprising power generating elements configured to generate alternating current signals;
one or more group circuits, each group circuit connecting a group of power generating elements in parallel in an electrical circuit to combine the alternating current signals from the power generating elements in the group into a single alternating current signal;
one or more rectifier circuits, each rectifier circuit comprising one or more rectifier channels, each rectifier channel connected to one of the group circuits, wherein each rectifier channel comprises a rectifier configured to generate a direct current signal from the alternating current signal;
a step down converter connected to the one or more rectifier circuits, the step down converter configured to convert a direct current signal to a direct current signal of a target voltage level;
an output switch connected to the step down converter;
a linear regulator connected to the step down converter;
a microcontroller connected to the linear regulator and the output switch and configured to control the output switch.

15. The device of claim 14, wherein the linear regulator is configured to convert a direct current signal from the step down converter to a direct current signal with a native voltage of the microcontroller.

16. The device of claim 14, wherein the microcontroller is configured to control the output switch by opening the output switch and closing the output switch.

17. The device of claim 14, wherein the microcontroller further comprises a radio configured to communicate with a transmitting device.

18. The device of claim 17, wherein the microcontroller is configured to communicate with the transmitting device using the radio when the linear regulator supplies sufficient power to operate the microcontroller.

19. The device of claim 18, wherein the communication with the transmitting device comprises one or of sending a measurement of a voltage of a direct current signal input into the step down converter, sending a measurement of a voltage of a direct current signal input to the output switch, sending a measurement of an amperage of a direct current signal output by the output switch, sending a message indicating that voltage of the direct current input to the output switch has fallen below a predetermined threshold, receiving a message instructing the microcontroller to open the output switch, and receiving a message instructing the microcontroller to close the output switch.

20. The device of claim 14, wherein the output switch is configured to output a direct current signal received form the step down converter when the output switch is closed and to output no signal when the output switch is open.

21. The device of claim 14, wherein the step down converter is further configured to receive the direct current signal from the one or more rectifier circuits.

22. The device of claim 21, wherein the direct current signal from the one or rectifier circuits has a varying voltage.

23. A method for controlling a power receiver circuit with a microcontroller comprising:
establishing communications with a transmitting device using a radio of the microcontroller;
receiving a message from the transmitting device instructing the microcontroller to transmit to the transmitting device a measurement of a voltage of direct current signal input into a step down converter and a measurement of a voltage of a direct current signal input into an output switch;
transmitting, to the transmitting device, a measurement of a voltage of a direct current signal input into a step down converter and a measurement of a voltage of a direct current signal input into an output switch;

receiving a message from the transmitting device instructing the microcontroller to close the output switch; and closing the output switch.

24. The method of claim 23, further comprising:

after closing the output switch, transmitting, to the transmitting device, a measurement of the voltage of the direct current signal input into a step down converter, a measurement of the voltage of the direct current signal input into an output switch, and a measurement of an amperage of a direct current signal output from the output switch.

25. The method of claim 23, further comprising:

receiving, from the transmitting device, a message instructing the microcontroller to open the output switch; and opening the output switch.

* * * * *